United States Patent
Murray et al.

(10) Patent No.: US 6,654,452 B1
(45) Date of Patent: Nov. 25, 2003

(54) METHOD AND APPARATUS IN A COMMUNICATIONS SYSTEM FOR DYNAMIC CALL REJECTION

(75) Inventors: Randall F. Murray, Rowlett, TX (US); Michael Andrew Sisto, Rockwall, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/392,132

(22) Filed: Sep. 8, 1999

(51) Int. Cl.[7] .............................................. H04M 3/00
(52) U.S. Cl. .............. 379/197; 379/210.02; 379/201.02
(58) Field of Search ........................... 379/210.02, 196, 379/197, 201.02

(56) References Cited

U.S. PATENT DOCUMENTS

| | | | | |
|---|---|---|---|---|
| 5,467,388 A | * | 11/1995 | Redd et al. .................. 379/196 |
| 5,864,612 A | * | 1/1999 | Strauss et al. .......... 379/142.03 |
| 5,920,623 A | * | 7/1999 | Bensman et al. ............ 379/361 |
| 6,330,317 B1 | * | 12/2001 | Garfinkel .................... 379/196 |
| 6,374,102 B1 | * | 4/2002 | Brachman et al. ........... 455/422 |

OTHER PUBLICATIONS

AT&T Bell Labs record titled "LASS: Putting the telephone customer in charge" By C. Brant Hirschman et al., May 1995.*

Telezapper TZ800B Telemarkting Deterrent 2002–2003 pp. 1–3.*

AT&T Bell Labs record titled "LASS: Putting the telephone customer in charge" By C. Brant Hirschman et al., May 1995.*

* cited by examiner

Primary Examiner—Ahmad F. Matar
Assistant Examiner—Rasha S Al-Aubaidi

(57) ABSTRACT

A method and apparatus in a communications system for processing a call. An activation signal is received from a terminal. Responsive to receiving the activation signal, a directory number is identified for a last call to the terminal. Responsive to a subsequent call to the terminal using the directory number, calls are selectively blocked to the terminal.

42 Claims, 4 Drawing Sheets

METHOD AND APPARATUS IN A COMMUNICATIONS SYSTEM FOR DYNAMIC CALL REJECTION

FIELD OF THE INVENTION

The present invention relates generally to an improved communications system and in particular to an improved method and apparatus for processing calls. Still more particularly, the present invention provides a method and apparatus for dynamically rejecting calls.

BACKGROUND OF THE INVENTION

Products and services are provided to telephone subscribers through a number of mechanisms including intelligent networks and switches. Intelligent networks allow delivery of services and features in an economic fashion. Some of the services provided to subscribers include a find me service, a follow me service, a call routing service, and an outgoing call restriction service. A find me service allows calls to be forwarded to another location while a follow me service allows a number to be forwarded on a time schedule. An outgoing call restriction service allows restriction of calls to specific numbers, prefixes, and area codes. Additionally, other services provided include caller identification, which provides a telephone number and name associated with the calling terminal. Switches are often provisioned with function and may provide features independently of or in conjunction with intelligent networks.

In addition to these services, the use of different types of terminal equipment is increasing. For example, computers may dial and call other numbers to establish a communications link to exchange data. Additionally, facsimile machines are commonly employed to send facsimiles to other parties in lieu of mail. This use of fax machines also includes the sending of advertisements.

These fax advertisements are typically set up using a list of phone numbers. Sometimes, the phone numbers may be for a voice number rather than another facsimile machine. In such a case, a subscriber, such as a person at an office receives a call from an unrecognized number. When the person answers the call, the person discovers that the originator of the call is a facsimile machine by the loud and annoying tone. Many of these facsimile machines will redial and continue to call a number for a certain number of retries to attempt to resend a facsimile. As a result, the person will receive a call again after a period of time. Such a continual recalling of the number is annoying and may be disruptive in an office or home environment. In other cases, if the person does not answer the phone, voice mail or an answering machine often will answer the telephone resulting in large number of messages containing nothing but tones and signals from a facsimile machine.

Therefore, it would be advantageous to have an improved method and apparatus for rejecting unwanted calls.

SUMMARY OF THE INVENTION

The present invention provides a method and apparatus for use in a communications system to selectively block or reject calls to a terminal. The mechanism of the present invention allows a user or subscriber at a terminal to easily block annoying or unwanted calls. The user activates the mechanism of the present invention through an activation signal generated at the terminal. The activation signal is typically a feature activation code that is entered after picking up or placing the terminal in an off hook state. By sending the activation signal, an identification of the last call is made and stored. This identification may be, for example, a directory number obtaining the caller line identifier information. When a call is made to the terminal, the stored identification is compared with an identification of the call. A match results in the call being blocked from completing.

The stored identification is stored or retained for a period of time. When the period of time, expires, the stored identification is removed or no longer used, and calls associated with the identification are no longer blocked or rejected. The period of time may be temporary or permanent. The period of time may be set based on the activation signal. For example, different feature activation codes may be used for different time periods.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
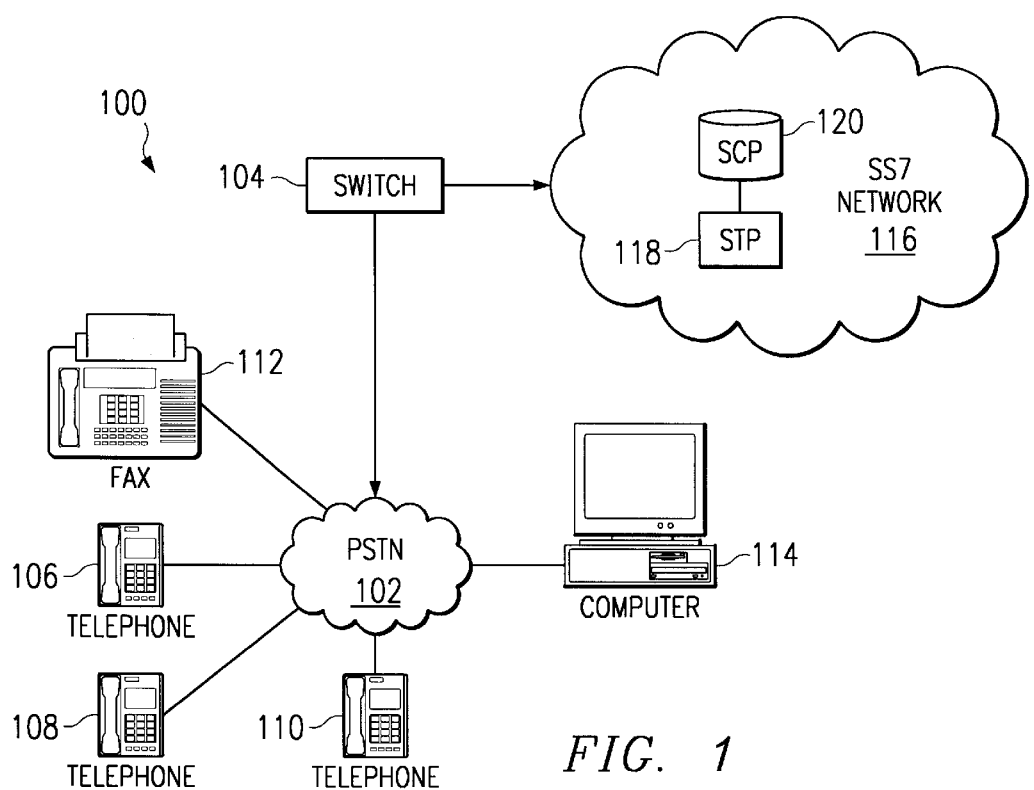
FIG. 1 is a diagram of a communications system depicted in accordance with a preferred embodiment of the present invention.

With reference now to FIG. 1, a diagram of a communications system is depicted in accordance with a preferred embodiment of the present invention. Communications system 100 includes a public switch telephone network 102.

Components, such as switch 104 is shown as a distinct element from PSTN 102 but is actually part of PSTN 102 and is shown for purposes of illustrating the present invention. In the depicted examples, telephone 106, telephone 108, and telephone 110 are examples of terminals connected to PSTN 102. Additionally, a facsimile machine 112 and a computer 114 are also are connected to PSTN 102. Switch 104 includes a connection to an SS7 network 116, which contains a signal transfer point (STP) 118 and a service control point (SCP) 120. STP 118 is employed to send signaling information to various signaling processors, which determine the actual switching of customer circuits in PSTN 102. In addition, STP 118 provides access to databases containing information about subscriber services, routing of special service numbers (800 number translation), calling card validation, and intelligent network services. Communications system 100 is intended as an example to illustrate the features of the present invention and not as an architectural limitation for the present invention. For example, communications system 100 may include a private branch exchange (PBX) instead of PSTN 102.

In the depicted examples, a subscriber at telephone 106 may call another subscriber at another terminal, such as telephone 110. Additionally, fax machine 112 may send faxes to computer 114. In some cases, fax machine 112 may attempt to send a fax to a user at a terminal, such as telephone 106. In this instance, the processes of the present invention may be used to dynamically reject calls originating from facsimile machine 112 or computer 114. The present invention provides a method, apparatus, and computer readable instructions for use in dynamically rejecting calls. In particular, a user at a terminal may send a signal through some key or set of keys on the terminal to reject calls originating from fax machine 112 in response to receiving a call from fax machine 112.

The mechanism of the present invention allows a subscriber to block or reject a call from an unwanted party by dialing a feature activation code. In the depicted examples, the feature code is processed by a switch. The switch may temporarily or permanently block the most recent call received by the user. The specific feature code may dictate the length of time the number would be blocked. In another aspect of the present invention, the processes of the present invention may enable a voice mail system or other phone answering system to automatically detect the receipt of a misdirected fax, based on signals associated with a facsimile machine and temporarily or permanently block the incoming number. This call blocking may occur within the phone answering system or by sending an appropriate feature activation code to the communications system.

Figure 2:
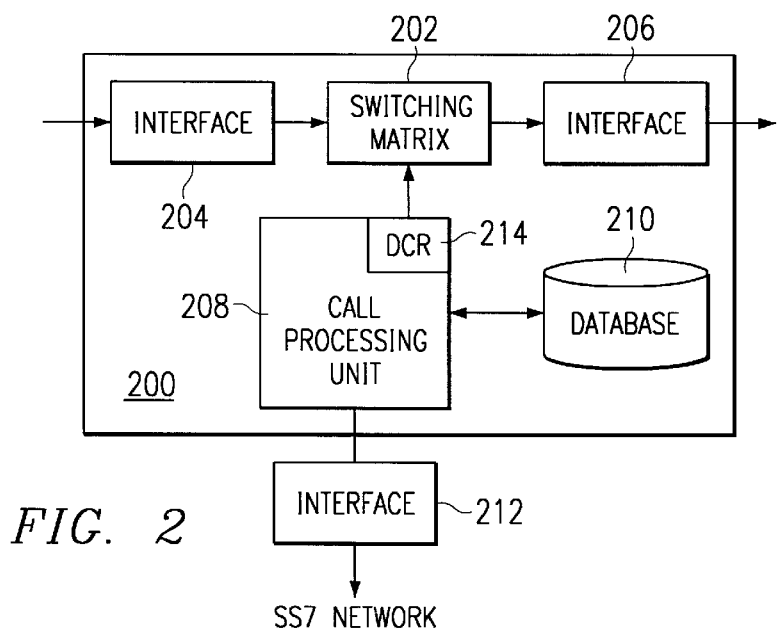
FIG. 2 is a block diagram of a switch depicted in accordance with a preferred embodiment of the present invention.

Turning now to FIG. 2, a block diagram of a switch is depicted in accordance with a preferred embodiment of the present invention. Switch 200 is an example of a switch which may be found in a communications system, such as switch 104 in FIG. 1. Switch 200 in the depicted example contains a switching matrix 202, which is employed to route incoming calls through interface 204 to various destinations through interface 206. The routing of a call through switching matrix 202 is controlled by call processing unit 208. In routing calls, call processing unit 208 may access information in database 210 or retrieve information from a SS7 network through interface 212. The dynamic call rejection (DCR) feature of the present invention may be implemented as software executing on call processing unit 208. The information used to determine whether a call is to be rejected may be stored in database 210 in switch 200 or in a SCP, which is accessed through interface 212. In the depicted example, DCR software 214 examines incoming caller line identification (CLI) information for a call to a target and compares the CLI with a list of directory numbers retrieved from database 210. If the originating directory number in the CLI is found in this list, switch 200 provides a treatment rather than completing the call to the target. This treatment may be, for example, a set of tones, a busy signal, or a recorded announcement. If the originating directory number is not in the list, the switch completes the call normally.

In the depicted example, the list in database 210 is provisioned with a directory number that is to be rejected in response to a subscriber issuing a signal or message, such as, for example, a feature activation code. In these examples, CLI information is required by the switch before the directory number can be added to the database. If the originating call does not include CLI information, the dynamic call rejection feature of the present information remains inactive in these examples.

Figure 3A:
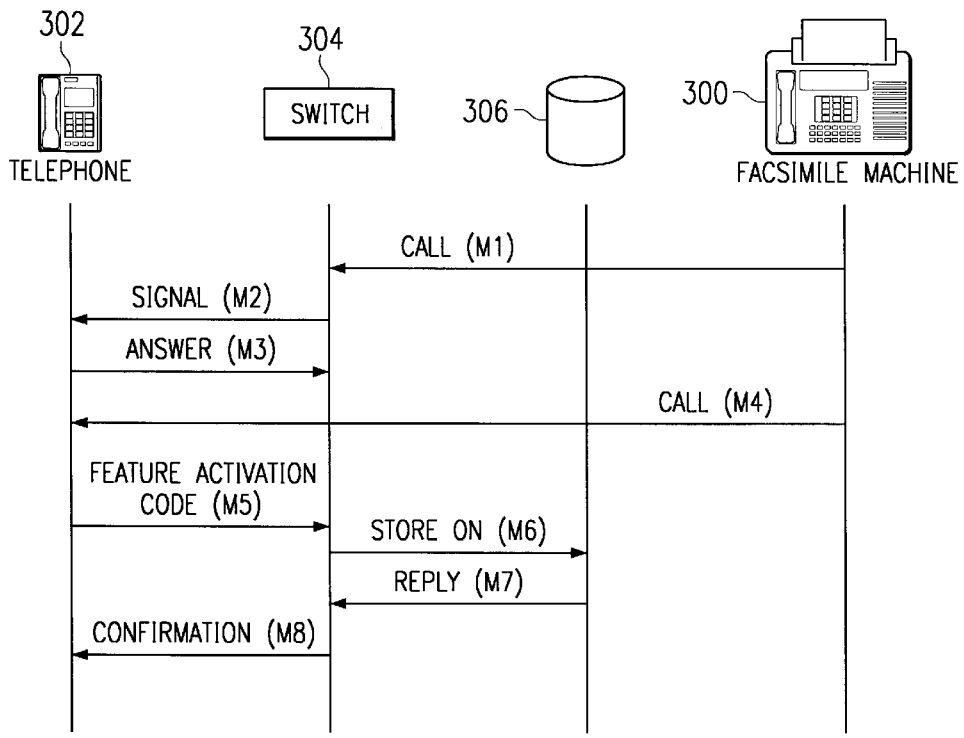
FIG. 3A is a message flow diagram illustrating activation of a dynamic call rejection feature depicted in accordance with a preferred embodiment of the present invention.

With reference now to FIG. 3A, a message flow diagram illustrating activation of a dynamic call rejection feature is depicted in accordance with a preferred embodiment of the present invention. In this example, facsimile machine 300 is originating a call to telephone 302 through switch 304. Facsimile machine 300 sends a request to switch 304 to set up a call to telephone 302 (step M1). Switch 304 will use the digits contained in the call from facsimile machine 300 to identify the call destination. Switch 304 signals telephone 302 (step M2). An answer is received by switch 304 for telephone 302 (step M3). The call is then connected between facsimile machine 300 and telephone 302 (step M4). At some point in time, the call is disconnected. At that point, in response to a disconnect signal from either the originator or terminator, the connection is taken down and the originating and terminating terminals are idle.

In the depicted examples, the directory number of the last call for each subscriber is obtained from the CLI information for the call and stored in a database at the terminating switch. In response to receiving a feature activation code for dynamic call rejection, the switch may query the database for the directory number of the last call to the subscriber and add this directory number to the rejection list.

Later, switch 304 receives a feature activation code from phone 302 (step M5). This feature activation may be, for example, a user lifting the handset on telephone 302 and dialing "75#", which generates the appropriate dual tone multifrequency (DTMF) signals recognized by the switch. Of course, other mechanisms may be used to activate the feature. In response, switch 304 stores the CLI information from the last call to telephone 302 in database 306, which may be a local or remote database to switch 304 (step M6). In the depicted examples, the switch will respond to calls that are terminated, whether or not the call is answered by a user at the terminal. In other words, an answer by a user at telephone 302 in step M3 is not required for the feature to be activated in accordance with a preferred embodiment of the present invention. For example, a user seeing an incoming call via a caller ID may recognize that the call is a malicious or unwanted call and may choose not to answer the call and pick up the phone and activate the dynamic call rejection feature of the present invention after the telephone stops ringing.

Database 306 sends a reply indicating that the information has been stored (step M7). In response, switch 304 sends a confirmation to telephone 302 that the feature has been activated (step M8). This confirmation may be, for example, a tone or voice message.

Figure 3B:
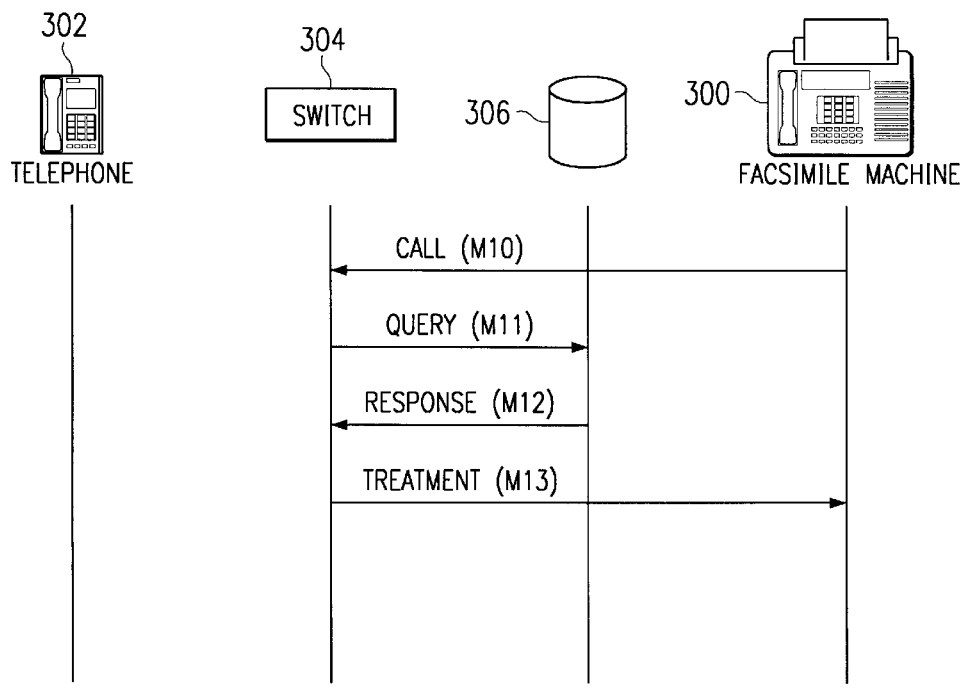
FIG. 3B is a message flow diagram illustrating processing a call with a dynamic call rejection feature depicted in accordance with a preferred embodiment of the present invention.

With reference now to FIG. 3B, a message flow diagram illustrating processing a call with a dynamic call rejection feature is depicted in accordance with a preferred embodiment of the present invention. In this example, a call is originated again from facsimile machine 300 to telephone 302. The call is received by switch 304 (step M10). In requesting a set up of the call CLI information is received by switch 304 for facsimile machine 300. Switch 304 requests a list of directory numbers from database 306 for the target, telephone 302 (step M11). In turn, database 306 returns a response containing the list (step M12). Alternatively, switch 304 may send the directory number to database 306 and receive a response as to whether the call should be completed. In such an alternate implementation, some of the processes are placed in database 306, which may be local or remote.

Switch 304 then determines whether the directory number in the CLI information for facsimile machine 300 is located in the list. Responsive to determining that the directory number for facsimile machine 300 is present in the list, switch 304 returns a treatment to facsimile machine 300 without completing the call to telephone 302 (step M13). As mentioned previously, this treatment may be, for example, a tone, a busy signal, or a message.

Figure 4:
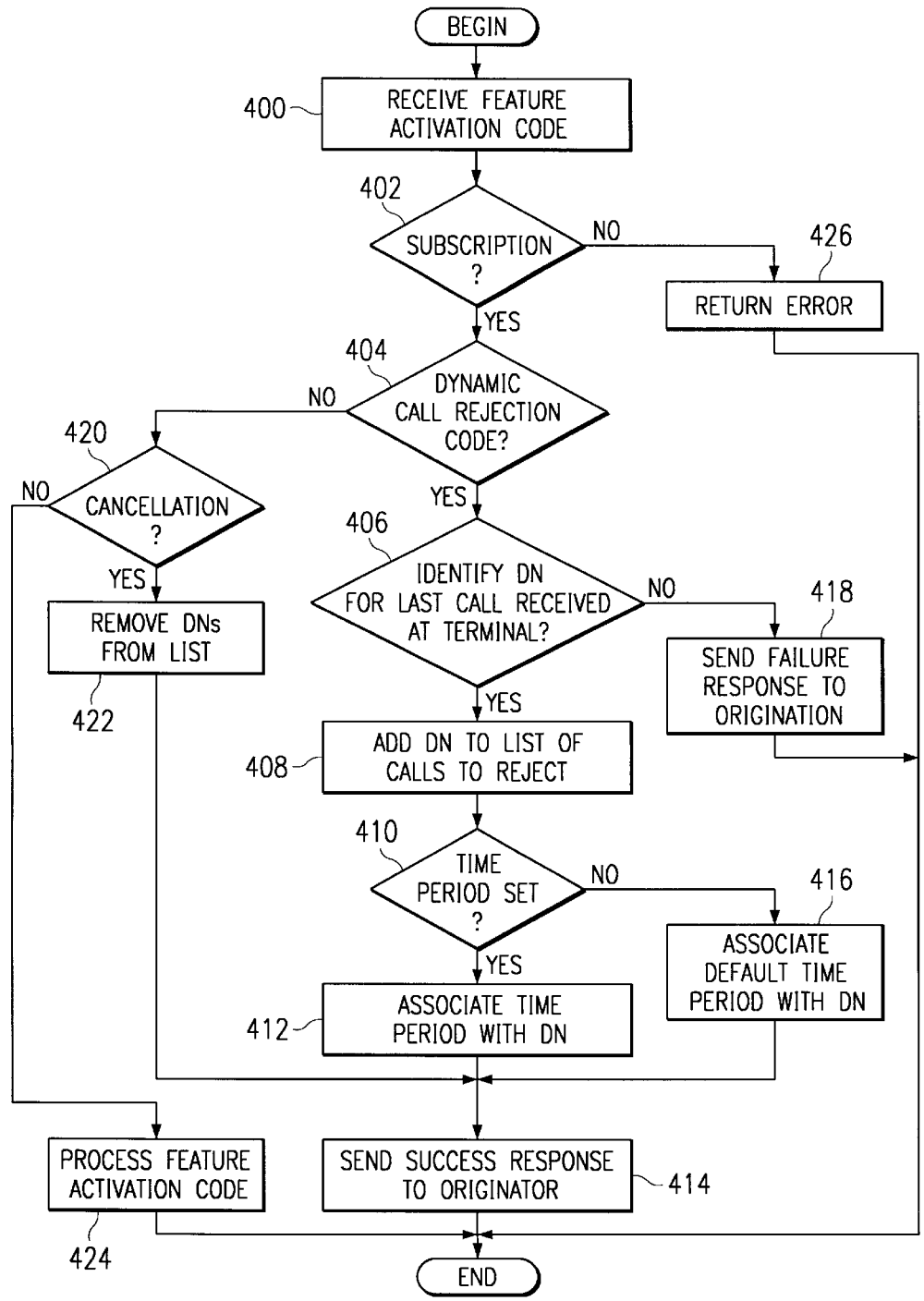
FIG. 4 is a flowchart of a process used to provision a number for a dynamic call rejection feature depicted in accordance with a preferred embodiment of the present invention.

With reference now to FIG. 4, a flowchart of a process used to provision a number for a dynamic call rejection feature is depicted in accordance with a preferred embodiment of the present invention. These processes may be implemented within a switch, such as switch 200 in FIG. 2. The process begins by receiving a feature activation code (step 400). A determination is first made as to whether a terminal has a subscription to the dynamic call rejection feature (step 402). If the terminal has a subscription, a determination is made as to whether the feature activation code is for dynamic call rejection (step 404). If the code is for dynamic call rejection, then a determination is made as to whether the directory number (DN) can be identified for the last call received at the terminal (step 406). If the call to the terminal did not include CLI information, the directory number is not available for use in rejecting subsequent calls.

If the directory number can be identified, the directory number is added to a list of calls to reject (step 408). A determination is made as to whether the received feature activation code sets a time period (step 410). A time period may be set during which a call from the directory number is rejected. This time period may be temporary or permanent. If a time period is set by the feature activation code, the time period is associated with the directory number in the list (step 412). Thereafter, a success response is sent to the originator of the feature activation code (step 414) with the process terminating thereafter. This success response may be, for example, a tone or a voice message.

With reference again to step 410, if a time period is not set by the feature activation code, a default time period is associated with the directory number (step 416) with the process proceeding directly to step 414 thereafter. This default time period may be a temporary time period, such as, for example, twelve hours or twenty-four hours. Alternatively, the default time period may be permanent. Referring back to step 406, if the directory number cannot be identified for the last call received at the terminal, then a failure response is sent to the originator of the feature activation code (step 418) with the process terminating thereafter.

Referring back to step 404, if the feature activation code is not a dynamic call rejection code, a determination is made as to whether the feature activation code is a cancellation of the dynamic call rejection feature (step 420). If the feature activation code is for a cancellation of the dynamic call rejection feature, the directory numbers associated with the originator are removed from the list of calls to reject (step 422) with the process then proceeding to step 414 as describe above. Alternatively, the switch could audibly present each directory number in a reject list and allow selective deletion.

With reference again to step 420, if the feature activation code is not for a cancellation of the dynamic call rejection feature, the system processes the feature activation code (step 424) with the process terminating thereafter. With reference again to step 402, if the terminal does not have a subscription to the dynamic call rejection feature, then a error message is returned to the terminals (step 426) with the process terminating thereafter. This error message may be, for example, in the form of a tone or voice message indicating that the feature is unavailable.

Figure 5:
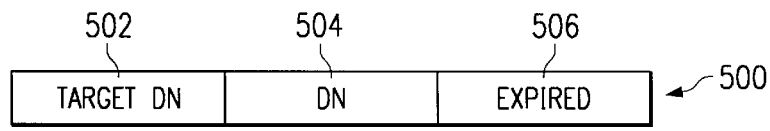
FIG. 5 is an example of entries used in a list or database for dynamically rejecting calls depicted in accordance with a preferred embodiment of the present invention.

Turning now to FIG. 5, examples of entries used in a list or database for dynamically rejecting calls is depicted in accordance with a preferred embodiment of the present invention. Entry 500 contains the target directory number in field 502, the directory number of the call to be rejected in field 504, and an expiration date and time in field 506. The target directory number in field 502 is used to sort or select numbers for a list. Alternatively, field 502 may be omitted and each entry may be associated with the target or subscriber activating the dynamic call rejection feature. In such a case, such an entry may be associated in a linked list for the target or subscriber. Although an expiration date and time is placed in field 506, a time period also may be used. For example, some set number of hours, days, or months may be placed in field 506. Alternatively, the call rejection may be permanent or at least until the dynamic call rejection feature is cancelled.

Figure 6:
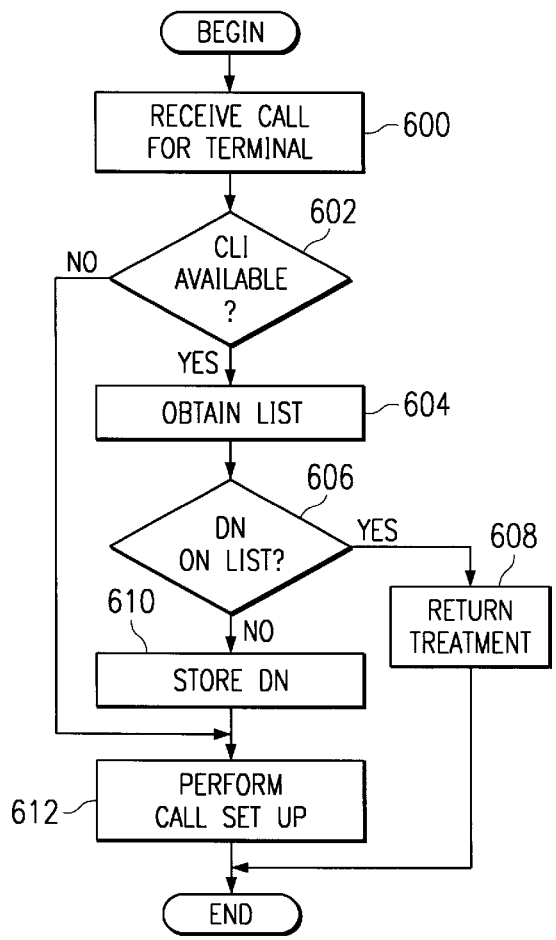
FIG. 6 is a flowchart of a process for processing calls using a dynamic call rejection feature depicted in accordance with a preferred embodiment of the present invention.

With reference now to FIG. 6, a flowchart of a process for processing calls using a dynamic call rejection feature is depicted in accordance with a preferred embodiment of the present invention. The process begins by receiving a call for a target terminal (step 600). A determination is made as to whether CLI information is available for the call (step 602). If CLI information is available, a list of directory numbers is obtained for the terminal (step 604). This list of directory numbers contains one or more directory numbers for calls that are to be rejected. A determination is then made as to whether the directory number in the CLI information is present on the list of directory numbers to be rejected (step 606). If the directory number from the CLI information is present in the list, treatment is returned to the originator of the call (step 608) with the process terminating thereafter. This treatment includes, for example, a busy signal, a tone, or a voice message. This treatment is sent in place of completing the call. As a result, the terminal, which is the target of the call, does not ring or generate an alert. In addition, the system may optionally perform operational measurements in which the switch will log the attempts for record keeping purposes.

With reference again to step 606, if the directory number is not found on the list, the directory number and the CLI information is stored in a database in association with the number being called (step 610). Then, normal call set up is performed (step 612) with the process terminating thereafter. Step 610 is used within this process such that the last originating directory number for each terminated call is stored in a database in the switch. This database may be used to find an originating directory number for a last terminated call for a customer when the customer activates the dynamic call rejection feature of the present invention. Referring back to step 602, if CLI information is unavailable, the process also proceeds to step 612 to perform call set up.

Figure 7:
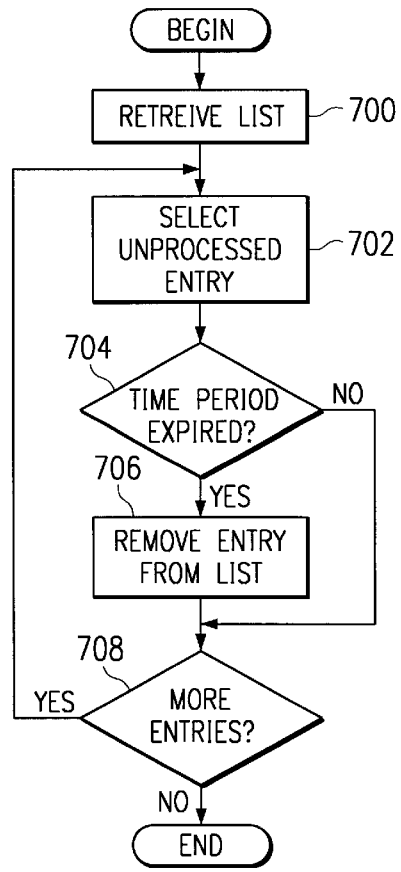
FIG. 7 is a flowchart of a process for removing directory numbers with expired time periods from a dynamic call rejection list depicted in accordance with a preferred embodiment of the present invention.

With reference now to FIG. 7, a flowchart of a process for removing directory numbers with expired time periods from a dynamic call rejection list is depicted in accordance with a preferred embodiment of the present invention. The process begins by retrieving the call rejection list for a particular subscriber (step 700). An unprocessed entry is selected from the list (step 702). A determination is made as to whether a time period for the unprocessed entry has expired (step 704). Typically, the entry will contain a period of time after which the directory number should no longer be used to reject calls. Also, it is possible that the entry is permanent and will not expire.

If the time period has expired, the entry is removed from the list (step 706). A determination is then made as to whether more unprocessed entries are present for processing (step 708). If more entries are present, the process returns to step 702 to select another unprocessed entry for processing. Otherwise, the process terminates.

With reference again to step 704, if the time period has not expired, the process proceeds to step 708 to determine whether more unprocessed entries are present for processing.

Thus, the present invention provides a method, apparatus, and computer implemented instructions for allowing subscribers an ability to quickly and easily block or reject calls from a particular number. Further, although the depicted examples illustrate the processes with respect to misdirected facsimiles, the processes also may be used for other situations to reject calls. For example, such a feature may be useful for a subscriber receiving malicious calls, sales calls, or any calls from unwanted callers. These features also may be implemented in a voice messaging system to automatically block calls containing content other than voice. In fact, these processes also may be used in a computer to reduce unwanted calls to a data line connected to the computer. The present invention also provides a feature in which the calls may be temporarily blocked for some selected period of time and then allowing calls to again be received from the previously blocked number.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. For example, the communications system also may include a wireless network with switches in which the processes of the present invention may be employed. Additionally, the dynamic call rejection feature of the present invention is not limited to telephones. The processes may be applied to other types of terminals, such as, for example, a computer or a facsimile machine. For example, a computer or personal digital assistant having a connection to the communications system may facilitate communication using Internet Protocol (IP) technology. Using IP, the information communicated is in the form of data packets containing any type of information, such as voice, e-mail, file, and video. This dynamic call rejection process of the present invention may be used to reject incoming data packets originating from a particular IP address. Although the depicted examples base the dynamic call rejection on a directory number, other identifiers may be used. For example, for systems using internet protocal (IP) addresses, this IP address may be used instead of a directory number. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a communications system for processing a call, the method comprising:

receiving an activation signal from a device associated with a terminal; responsive to receiving the activation signal, identifying a directory number for a last call to the terminal; and responsive to a subsequent call to the terminal, using the directory number to selectively block the subsequent call to the terminal from said directory number, wherein the activation signal is automatically transmitted from the device associated with the terminal in response to a determination that the last call originated from an automated electronic device.

2. The method of claim 1, wherein the activation signal is a selected dual tone multifrequency signal generated by the terminal.

3. The method of claim 1, wherein the activation signal is a feature activation code.

4. The method of claim 1, wherein the terminal is a telephone.

5. The method of claim 1, wherein the terminal is a computer.

6. The method of claim 1, wherein the terminal is a facsimile machine.

7. The method of claim 1, wherein the communications system is a public switched telephone network.

8. The method of claim 1, wherein the receiving, identifying, and using steps are performed by a switch.

9. The method of claim 1, wherein the receiving, identifying, and using steps are performed by a messaging system.

10. The method of claim 1, wherein the automated electronic device is a facsimile machine.

11. A method in a communications system for processing a call, the method comprising:

receiving an activation signal from a terminal;

identifying an identifier for a last originator of a last call to the terminal in response to receiving the activation signal from the terminal, wherein the identifier is identified as a blocking identifier for a temporary period of time;

responsive to a subsequent call from an originator to the terminal and the blocking identifier being present in a list of blocking identifiers associated with the terminal, comparing the directory number of the originator to the blocking identifier; and automatically blocking the subsequent call in response to a match between the identifier of the originator to the blocking identifier, wherein the list of blocking identifiers includes one or more entries having a blocking identifier and an associated time period for which calls matching the blocking identifier are to be blocked, and wherein the activation signal is automatically sent from the terminal in response to a determination that the last originator is an automated electronic device.

12. The method of claim 11, wherein the activation signal is a selected dual tone multifrequency signal generated by the terminal.

13. The method of claim 11, wherein the activation signal is a feature activation code.

14. The method of claim 11, wherein the terminal is a telephone.

15. The method or claim 11, wherein the terminal is a computer.

16. The method of claim 11, wherein the terminal is a facsimile machine.

17. The method of claim 11, wherein the identifier is a directory number for the originator of the last call.

18. The method of claim 11, wherein the activation signal is automatically transmitted front a device associated with the terminal in response to a determination that the last call originated front an automated electronic device.

19. The method of claim 18, wherein the automated electronic device is a facsimile machine.

20. A communications system comprising:
a plurality of communications links, wherein the plurality of communications links provides a medium for connecting a call between a plurality of terminals; and
a switch connected to the communications link, wherein the switch identifies a first directory number for a list call to a selected terminal within the plurality of terminals in response to receiving an activation signal from a device associated with the selected terminal, compares the first directory number to a second directory number in a request from a second terminal within the plurality of terminals to the selected terminal, and blocks completion of the call to the selected terminal in response to a match between the first directory number and the second directory number, wherein the activation signal is automatically transmitted from the device associated with the terminal in response to a determination that the last call originated from an automated electronic device.

21. The communication system of claim 20, wherein the automated electronic device is a facsimile machine.

22. A communications system for processing a call, the communications system comprising:
receiving means for receiving an activation signal from a device associated with a terminal;
identifying means, responsive to receiving the activation signal, for identifying a directory number for a last call to the terminal; and
blocking means, responsive to a subsequent call to the terminal, using the directory number to selectively block calls to the terminal from said directory number, wherein the activation signal is automatically transmitted from the device associated with the terminal in response to a determination that the last call originated front an automated electronic device.

23. The communications system of claim 22, wherein the activation signal is a selected dual tone multifrequency signal generated by the terminal.

24. The communications system of claim 22, wherein the activation signal is a feature activation code.

25. The communications system of claim 22, wherein the terminal is a telephone.

26. The communications system of claim 22, wherein the terminal is a computer.

27. The communications system of claim 22, wherein the terminal is a facsimile machine.

28. The communications system of claim 22, wherein the communications system is a public switched telephone network.

29. The communications system of claim 22, wherein the receiving means, identifying means, and using means are performed by a switch.

30. The communications system of claim 22, wherein the receiving means, identifying means, and using means are performed by a messaging system.

31. A communications system for processing a call, the communications system comprising:
receiving means for receiving an activation signal from a terminal;
identifying means for identifying an identifier for a list originator for a last call to the terminal in response to receiving the activation signal from the terminal, wherein the identifier is identified as a blocking identifier for a temporary period of time;
comparing means, responsive to a subsequent call from an originator to the terminal and the blocking identifier being present in a list of blocking identifiers associated with the terminal, for comparing the directory number of the originator to the blocking identifier; and
blocking means for blocking the subsequent call in response to a match between the directory number of the originator to the identified directory number, wherein the list of blocking identifiers includes one or more entries having a blocking identifier and an associated time period for which calls matching the blocking identifier are to be blocked, and wherein the activation signal is automatically sent from the terminal in response to a determination that the last originator is an automatic electronic device.

32. The communications system of claim 31, wherein the activation signal is a selected dual tone multifrequency signal generated by the terminal.

33. The communications system of claim 31, wherein the activation signal is a feature activation code.

34. The communications system of claim 31, wherein the terminal is a telephone.

35. The communications system of claim 31, wherein the terminal is a computer.

36. The communications system of claim 31, wherein the terminal is a facsimile machine.

37. The communications system of claim 31, wherein the identifier is a directory number for the originator of the last call.

38. The communication system of claim 31, wherein the activation signal is automatically transmitted from a device associated with the terminal in response to a determination that the last call originated from an automated electronic device.

39. A computer program product in a computer readable medium for use in processing a call in a communications system, the computer program product comprising:
first instructions for receiving an activation signal from a device associated with a terminal;
second instructions, responsive to receiving the activation signal, for identifying a directory number for a last call to the terminal; and third instructions, responsive to a subsequent call to the terminal, using the directory member to selectively block calls to the terminal, wherein the activation signal is automatically transmitted from the device associated with the terminal in response to a determination that the last call originated from an automated electronic device.

40. A computer program product in a computer readable medium for use in processing a call in a communications system, the computer program product comprising:

first instructions for receiving an activation signal from a terminal;

second instructions for identifying an identifier for a last originator of a last call to the terminal in response to receiving the activation signal front the terminal, wherein the identifier is identified as a blocking identifier for a temporary period of time;

third instructions, responsive to a subsequent call from an originator to the terminal and the blocking identifier being present in a list of blocking identifiers associated with the terminal, for comparing the directory number of the originator to the blocking identifier; and fourth instructions for automatically blocking the subsequent call in response to a match between the identifier of the originator to the blocking identifier, wherein the list of blocking identifies includes one or more entries having a blocking identifier and an associated time period for which calls matching the blocking identifier are to be blocked, and wherein the activation signal is automatically sent from the terminal in response to a determination that the last originator is an automated electronic device.

41. A method in a communication system for processing a call, comprising:

receiving a call signal from a first terminal;

automatically determining if the first terminal is an automated electronic device based on the call signal; and automatically transmitting a call blocking activation signal to a switch in the communication system in response to determining that the first terminal is an automated electronic device, wherein the call blocking activation signal causes the switch to add a directory number associated with the first terminal to a call blocking list used to block subsequent calls.

42. The method of claim 41, wherein the automated electronic device is a facsimile machine.

* * * * *